United States Patent [19]

Asai et al.

[11] Patent Number: 5,164,115
[45] Date of Patent: Nov. 17, 1992

[54] AROMATIC POLYSULFONE RESIN COMPOSITION

[75] Inventors: Kuniaki Asai, Tondabayashi; Tadayasu Kobayashi; Mituo Maeda, both of Tsukuba, all of Japan

[73] Assignee: Sumitomo Chemical Company, Limited, Osaka, Japan

[21] Appl. No.: 618,502

[22] Filed: Nov. 27, 1990

[30] Foreign Application Priority Data

Dec. 1, 1989 [JP] Japan .................................. 1-313736

[51] Int. Cl.$^5$ .................................................. H01B 1/24
[52] U.S. Cl. ...................................... 252/511; 252/510
[58] Field of Search .............................. 252/510, 511

[56] References Cited

U.S. PATENT DOCUMENTS

3,981,945  9/1976  Attwood et al. ............... 260/900

FOREIGN PATENT DOCUMENTS

63-175064  1/1987  Japan .

OTHER PUBLICATIONS

Database Chemical Abstracts (Host: STN), vol. 110, No. 10, 1988, abstract No. 77061t, Columbus, Ohio, US; and JP-A-63 175 064 (Dainippon Ink and Chemicals Inc.) Jul. 19, 1988.

*Primary Examiner*—Mark L. Bell
*Assistant Examiner*—Deborah Jones
*Attorney, Agent, or Firm*—Stevens, Davis, Miller & Mosher

[57] ABSTRACT

An aromatic polysulfone resin composition comprising 100 parts by weight of an aromatic polysulfone resin, 3 to 15 parts by weight of an electro-conductive carbon black having a dibutyl phthalate absorption of 150 ml/100 g or more and 0.1 to 2.5 parts by weight of a fluorocarbon-type surface active agent. The aromatic polyslfone resin composition has surface resistivity in a range of $10^7$ to $10^{13}$ Ω, remarkably lowered initial charged voltage and half-life period, and excellent thermal stability and dimensional accuracy, so that it is suitable for use as a material for electronic parts, office automation equipment parts and audiovisual equipment parts.

7 Claims, No Drawings

AROMATIC POLYSULFONE RESIN COMPOSITION

The present invention relates to an aromatic polysulfone resin composition having an excellent antistatic property, high thermal resistance and high dimensional accuracy and being suitable for use as a material for electronic parts, office automation equipment parts and audiovisual equipment parts, etc.

The aromatic polysulfone resin is isotropic and has a small mold shrinkage ratio because it is an amorphous substance, and also it has a higher glass transition point than that of resins having a high thermal resistance like polyphenylene sulfide and polyether ketone. Consequently, as compared with these resins, the aromatic polysulfone resin shows only a small lowering in physical properties such as strength, modulus of elasticity, creep resistance, etc. at higher temperatures, so that it is a desirable material for electronic parts, office automation equipment parts and audiovisual equipment parts for which a high dimensional accuracy and high thermal resistance are required. Particularly, by blending the aromatic polysulfone resin with a fibrous material such as glass fibers, the mold shrinkage ratio becomes smaller and the strength and modulus of elasticity are enhanced, so that the resin is a more desirable material for the electronic parts, office automation equipment parts and audiovisual equipment parts. For example, the resin composition is applied to the production of relays, switches, connectors, sockets, coil bobbins, semiconductor-loaded carriers, printed circuit boards, condenser parts, floppy disk drive carriages, compact disk pickups, etc.

However, in order to cause the electronic parts, office automation equipment parts and audiovisual equipment parts to have the insulating property inherent to the resin and excellent antistatic property, the surface resistivity of the resin needs to be in a range of $10^7$ to $10^{13}$ $\Omega$. It is possible to cause the surface resistivity to be in the above range by adding an electroconductive carbon black to the resin.

Since, however, the electronic parts, office automation equipment parts and audiovisual equipment parts require sliding when operated and may mis-operate even by adhesion of trace amounts of dusts, it is not sufficient for these parts to merely keep the surface resistivity in the above range but it is required for these parts to have a lowered initial charged voltage and excellent attenuation characteristics when charged. Generally, the attenuation characteristics of charged matters are expressed by a half-life period, which is a time required for the initial charged voltage to lower to a half. By the mere addition of a particular electroconductive carbon black to the aromatic polysulfone resin, it is possible to obtain a surface resistivity of $10^7$ to $10^{13}$ $\Omega$, but there is a problem that the initial charged voltage is high and the half-life period is long in this range of surface resistivity.

An object of the present invention is to provide an aromatic polysulfone resin composition having such an excellent antistatic property that the surface resistivity is in a range of $10^7$ to $10^{13}$ $\Omega$ and both the initial charged voltage and half-life period have been lowered, and a high thermal resistance and high dimensional accuracy, as well as being suitable for use as a material for electronic parts, office automation equipment parts and audiovisual equipment parts.

The present inventors have extensively studied to solve the above problems, and as a result have found that the above object can be attained by blending the aromatic polysulfone resin with particular amounts of a particular electroconductive carbon black and a fluorocarbon-type surface active agent. The present inventors thus attained to the present invention.

The present invention provides an aromatic polysulfone resin composition having an excellent antistatic property, high thermal resistance and high dimensional accuracy which comprises 100 parts by weight of an aromatic polysulfone resin, 3 to 15 parts by weight of an electroconductive carbon black having a dibutyl phthalate absorption (hereinafter referred to as DBP absorption) of 150 ml/100 g or more and 0.1 to 2.5 parts by weight of a fluorocarbon-type surface active agent.

The aromatic polysulfone resin used in the present invention is defined as a polyarylene compound in which an arylene unit is disorderly or orderly arranged together with an ether bond and sulfone bond. Typical examples include those having the following repeating units:

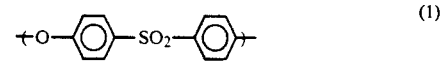
(1)

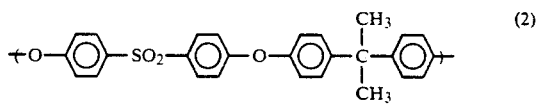
(2)

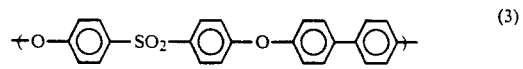
(3)

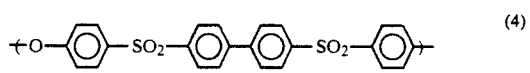
(4)

Among these, those having a repeating unit of (1) or (2) are preferred. Those having a repeating unit of (1) are marketed as VICTREX ® PES 3600P, 4100P and 4800P from ICI Co., Ltd. Those having a repeating unit of (2) are marketed as UDEL ® P-1700 from AMOCO Co., Ltd. Among the two, an aromatic polysulfone having a repeating unit of (1) is particularly preferred.

The particular electroconductive carbon black used in the present invention refers to those having a DBP absorption of 150 ml/100 g or more. As commercially available products, there are mentioned Ketjen Black ® EC and Ketjen Black ® EC600DJ (produced by Lion Akzo Co., Ltd.), Vulcan ® XC-72 (produced by Cabot Corp.), and the like. The DBP absorption means an oil absorption specified in AST D-2414-88.

In adding the electroconductive carbon black to the aromatic polysulfone resin, when the electroconductive carbon black has a DBP absorption of less than 150 ml/100 g, its amount results in exceeding 15 parts by weight per 100 parts by weight of the aromatic polysulfone resin in order to keep the surface resistivity in a desired range of $10^7$ to $10^{13}$ $\Omega$. As a result, the melt viscosity of the resulting composition increases to lower the moldability and mechanical strength. On the other hand, an increase in the DBP absorption of the electroconductive carbon black has a large effect to lower the surface resistivity, so that the surface resistivity can be kept in the desired range with small amounts of the electroconductive carbon black. However, when the amount is less than 3 parts by weight per 100 parts by weight of the aromatic polysulfone resin, there is also a problem that it is difficult to keep the surface resistivity in the range of $10^7$ to $10^{13}$ Ω, and besides that the surface resistivity delicately changes with a slight change of the amount. However, smaller amounts of the electroconductive carbon black have a smaller effect on the moldability and mechanical strength, so that it is particularly preferred to use Ketjen Black ®, which is an electroconductive carbon black having a DBP absorption of 300 ml/100 g or more. The upper limit of the DBP absorption is not limited, but a value of 750 ml/100 g or less is suitable for the convenience of production. It is also possible to use two or more electroconductive carbon blacks having different oil absorptions.

The fluorocarbon-type surface active agent used in the present invention is one having a fundamental skeleton of fluorocarbon and a hydrophilic group bonded thereto. The fluorocarbon-type surface active agent, even at a high temperature of 300° to 400° C. at which the resin composition of the present invention is processed, must not fail to exhibit a desired effect by being gasified at the temperature and released out of the resin composition, and must not carbonize to give adverse effects on the thermal stability of the composition. As to the thermal stability of the fluorocarbon-type surface active agent, which is expressed by the value of weight loss at 350° C. measured by thermogravimetric analysis in which the agent is heated at a rate of increasing temperature of 10° C./min in a nitrogen gas atmosphere, the smaller the value, the higher the stability. When the value of weight loss is about 10 percent by weight or less, there appears no problems at the processing step of the resin composition.

As the commercially available products of such the surface active agent, there are mentioned Flurad ® FC-95 and FC-98, which are the potassium salt of perfluoroalkylsulfonic acid (produced by 3M Co., Ltd.), Flurad ® FC-124, which is the lithium salt of trifluoromethanesulfonic acid (produced by 3M Co., Ltd.), Ftergent ® 100 and 110, which are the sulfonic acid salt of a highly branched perfluorocarbon (produced by Neos Co., Ltd.), etc.

In adding the fluorocarbon-type surface active agent to the aromatic polysulfone resin composition, when the amount of the agent is less than 0.1 part by weight per 100 parts by weight of the polysulfone resin, effects to lower the initial charged voltage and half-life period of the resin composition is little observed. When the amount exceeds 2.5 parts by weight, said effects do not improve so much and the mechanical strength of the molded products lowers.

To the resin composition of the present invention may be optionally added fibrous reinforcing materials such as glass fibers, silica-alumina fibers, wollastonite, carbon fibers, potassium titanate fibers, etc., inorganic fillers such as calcium carbonate, talc, mica, clay, glass beads, etc., mold-release improving agents such as polytetrafluoroethylene and metal soaps represented by barium stearate, and coloring agents such as dyes, pigments, etc. Particularly, when the aromatic polysulfone resin composition is used to produce the electronic parts, office automation equipment parts and audiovisual equipment parts, it is preferred to reinforce the parts by mixing 100 parts by weight of the amorphous resin and 120 parts by weight or less, preferably 80 parts by weight or less of the glass fiber, silica-alumina fiber, wollastonite or potassium titanate fiber in terms of dimensional accuracy, strength and modulus of elasticity.

In producing electronic parts, office automation equipment parts and audiovisual equipment parts having a small and complicated shape or a thin-wall portion, it is preferred to improve releasability from a mold at the time of molding by additionally adding metal soap, etc.

To the composition of the present invention may also be added at least one of thermoplastic resins such as polyethylene, polypropylene, polyamide, polyester, polycarbonate, modified polyphenylene oxide, polyphenylene sulfide, polyetherimide, polyetherketone, polyamideimide, etc. and thermosetting resins such as phenol resin, epoxy resin and polyimide so far as there is no hindrance to the object of the present invention.

A materials-blending means for obtaining the resin composition of the present invention is not particularly limited. However, it is a common practice to mix the aromatic polysulfone resin, electroconductive carbon black, fluorocarbon-type surface active agent and optionally fibrous reinforcing materials such as glass fibers and a mold-release agent such as metal soaps by means of a Henschel mixer, tumbler, etc., and then melt-knead the resulting mixture using an extruder.

Examples of the present invention are shown below, but the present invention is not limited thereto. The physical properties shown in the examples were measured by the following methods.

(1) Surface resistivity: The aromatic polysulfone resin composition of the present invention was injection-molded into disks of 100 mm in diameter and 3 mm in thickness by means of an injection-molding machine (SYCAP N110/45; produced by Sumitomo Heavy Industries, Ltd.) at a cylinder temperature of 360° C. and a mold temperature of 150° C., and the surface resistivity of the disk was measured with an insulation resistance tester (SM-10E; produced by Toa Denpa Kogyo K.K.) according to ASTM D-257.

(2) Initial charged voltage and half-life period: Flat plates of 64 mm in length, 64 mm in width and 3 mm in thickness were prepared under the same molding conditions as in the preparation of the disk described in (1) above. The flat plate was placed on a turn table, and a distance between the upper surface of the plate and the tip of a needle electrode which was an applied part and a distance between the upper surface of the plate and an electrode which was a receiving part were each adjusted to 20 mm. Corona discharge (applied voltage, 10 KV) was applied for 5 seconds to the test piece, the flat plate, while turning the turn table to charge the test piece. Applying was stopped, and the initial charged voltage and a period of time for the initial charged voltage to lower to a half were measured by means of a static honestmeter (S-5109; produced by Shishido Seidenki K.K.).

(3) Flexural strength and heat distortion temperature: Test pieces of 127 mm in length, 12.7 mm in width and 6.4 mm in thickness were prepared under the same molding conditions as in the preparation of the disk described in (1) above. Using the test pieces, the flexural strength and heat distortion temperature were measured according to ASTM D-790 and ASTM D-648, respectively.

(4) Thermal stability at the time of processing: The aromatic polysulfone resin composition of the present invention was pelletized and fed to Koka type flow tester equipped with a dies of 1 mm in nozzle diameter and 10 mm in land length (produced by Shimadzu Seisakusho, Ltd.). The pellets were kept at 400° C. for varying times of 5 minutes and 30 minutes and extruded through the dies under a load of 50 kg/cm² to measure a melt viscosity for each time.

EXAMPLES 1 TO 8 AND COMPARATIVE EXAMPLES 1 TO 7

100 Parts by weight of an aromatic polysulfone resin powder (VICTREX® PES 3600P; produced by ICI Co., Ltd.), 25 parts by weight of a chopped glass fiber (CS03 MAPX1; produced by Asahi Glass Fiber Co., Ltd.), Ketjen Black® EC (produced by Lion Akzo Co., Ltd.), which is an electroconductive carbon black having a DBP absorption of 350 ml/100 g, and Flurad® FC-95 or Ftergent® 100, which is a fluorocarbon-type surface active agent were mixed with one another in a Henschel mixer in proportions shown in Table 1, and granulated by a twin-screw extruder (PCM30; produced by Ikegai Corp.) at a cylinder temperature of 340° C. to obtain pellets of the aromatic polysulfone resin composition.

Flurad®FC-95 and Ftergent® 100 were subjected to thermogravimetric analysis in which they were heated at a rate of increasing temperature of 10° C./min in a nitrogen gas atmosphere to obtain the values of weight loss at 350° C. of the both test samples. As a result, the values were 1.0 wt. % and 7.4 wt. %, respectively.

In the same manner as above, a composition comprising the aromatic polysulfone resin and glass fiber (Comparative Example 1), a composition comprising the above two components and the electroconductive carbon black (Comparative Example 2) and a composition comprising the above two components and Flurad® FC-95 (Comparative Example 3) were prepared and granulated into pellets.

These pellets were measured for the thermal stability at the time of processing by the method described above. Also, these pellets were injection-molded by the method described above, and measured for electrical characteristics (i.e. surface resistivity, initial charged voltage, and half-life period), flexural strength and heat distortion temperature. The results are shown in Table 1.

TABLE 1

| | Composition | | | | | |
|---|---|---|---|---|---|---|
| | Aromatic polysulfone (part by weight) | Glass fiber (part by weight) | Electroconductive carbon black | | Surface active agent | |
| | | | Kind | Amount (part by weight) | Kind | Amount (part by weight) |
| Example 1 | 100 | 25 | Ketjen Black EC | 8 | Flurad FC-95 | 0.2 |
| Example 2 | 100 | 25 | " | 8 | " | 0.7 |
| Example 3 | 100 | 25 | " | 8 | " | 1.4 |
| Example 4 | 100 | 25 | " | 8 | " | 2.1 |
| Example 5 | 100 | 25 | " | 8 | Ftergent 100 | 0.2 |
| Example 6 | 100 | 25 | " | 8 | " | 0.7 |
| Example 7 | 100 | 25 | " | 8 | " | 1.4 |
| Example 8 | 100 | 25 | " | 8 | " | 2.1 |
| Comparative | | | | | | |
| Example 1 | 100 | 25 | — | — | — | — |
| Example 2 | 100 | 25 | Ketjen Black EC | 8 | — | — |
| Example 3 | 100 | 25 | — | — | Flurad FC-95 | 1.4 |
| Example 4 | 100 | 25 | Ketjen Black EC | 8 | " | 0.05 |
| Example 5 | 100 | 25 | " | 8 | " | 3.0 |
| Example 6 | 100 | 25 | " | 8 | Ftergent 100 | 0.05 |
| Example 7 | 100 | 25 | " | 8 | " | 3.0 |

| | Composition | | | | | | |
|---|---|---|---|---|---|---|---|
| | Electrical characteristics | | | | | Thermal stability at the time of processing (melt viscosity at 400° C.) | |
| | Surface resistivity ($\Omega$) | Initial charged voltage (V) | Half-life period (sec) | Flexural strength (kg/cm²) | Heat distortion temperature (° C.) | 5 minutes' stay (poise) | 30 minutes' stay (poise) |
| Example 1 | $10^{12}$ | 730 | 18 | 1270 | 212 | 4000 | 5500 |
| Example 2 | $10^{10}$ | 470 | 15 | 1250 | 212 | 4200 | 5300 |
| Example 3 | $10^{9}$ | 180 | 6 | 1210 | 212 | 4400 | 5400 |
| Example 4 | $10^{9}$ | 100 | 2 | 1220 | 212 | 4500 | 5600 |
| Example 5 | $10^{12}$ | 810 | 18 | 1280 | 213 | 4100 | 5300 |
| Example 6 | $10^{11}$ | 470 | 8 | 1280 | 213 | 4300 | 5200 |
| Example 7 | $10^{9}$ | 240 | 3 | 1220 | 213 | 4200 | 5400 |
| Example 8 | $10^{8}$ | 120 | 2 | 1140 | 212 | 4800 | 5700 |
| Comparative | | | | | | | |
| Example 1 | $10^{15}$ | 2000 | >200 | 1550 | 210 | 1900 | 3700 |
| Example 2 | $10^{12}$ | 1130 | 31 | 1290 | 213 | 3900 | 6000 |
| Example 3 | $10^{14}$ | 1550 | 140 | 1540 | 211 | 2000 | 3700 |
| Example 4 | $10^{12}$ | 1100 | 30 | 1290 | 212 | 3900 | 5900 |
| Example 5 | $10^{9}$ | 90 | 2 | 1040 | 210 | 5300 | 6100 |
| Example 6 | $10^{12}$ | 1070 | 30 | 1280 | 213 | 4000 | 5800 |
| Example 7 | $10^{8}$ | 100 | 2 | 960 | 212 | 5600 | 6300 |

From comparison between Comparative Examples 1 and 2, the following can be seen: By adding the electroconductive carbon black, the surface resistivity lowers from $10^{15}$ $\Omega$ to $10^{12}$ $\Omega$, but the initial charged quantity and half-life period lower only insufficiently. From comparison between Comparative examples 1 and 3, the surface resistivity, initial charged quantity and half-life period do not much lower by adding the fluorocarbon-type surface active agent.

On the other hand, the aromatic polysulfone resin compositions of the present invention containing the electroconductive carbon black and fluorocarbon-type surface active agent (Examples 1 to 8), as compared with the composition containing no fluorocarbon-type surface active agent (Comparative Example 2), do not show remarkable changes in the flexural strength, heat distortion temperature and thermal stability at the time of processing, and show a remarkable lowering in the initial charged voltage and half-life period with an increasing amount of the fluorocarbon-type surface active agent. Further, a lowering in the surface resistivity also is observed, from which it can be expected that the amount of the electroconductive carbon black can be decreased. Compositions containing less than 0.1 part by weight of the fluorocarbon-type surface active agent (Comparative Examples 4 and 6) show almost the same initial charged voltage and half-life period as those of the composition containing no fluorocarbon-type surface active agent. One the other hand, the compositions containing the fluorocarbon-type surface active agent in an amount of more than 2.5 parts by weight (Comparative Examples 5 and 7) show almost the same effect to lower the initial charged voltage and half-life period as that of the compositions containing 2.1 parts by weight of said surface active agent (Examples 4 and 8), but show a remarkable lowering in the flexural strength.

EXAMPLES 9 TO 12 AND COMPARATIVE EXAMPLES 8 TO 10

Procedure was carried out in the same manner as in Examples 1 to 8, except that Vulcan ® XC-72 having a DBP absorption of 215 ml/100 g (produced by Cabot Corp.) was added as the electroconductive carbon black in an amount of 14 parts by weight per 100 parts by weight of the aromatic polysulfone resin powder. The results are shown in Table 2.

The aromatic polysulfone resin compositions of the present invention containing the electroconductive carbon black and fluorocarbon-type surface active agent, as compared with the composition containing no fluorocarbon-type surface active agent (Comparative Example 8), show a remarkable lowering in the initial charged voltage and half-life period without causing deterioration of the flexural strength, heat distortion temperature and thermal stability at the time of processing.

Further, a lowering in the surface resistivity is also observed, from which it can be expected that the amount of the electroconductive carbon black can be decreased. The composition containing less than 0.1 part by weight of the fluorocarbon-type surface active agent (Comparative Example 9) shows almost the same initial charged voltage and half-life period as those of the compositions containing no fluorocarbon-type surface active agent. On the other hand, the composition containing the fluorocarbon-type surface active agent in an amount of more than 2.5 parts by weight (Comparative Example 10) shows almost the same effect to lower the initial charged voltage and half-life period as that of the composition containing 2.1 parts by weight of said surface active agent (Example 12), but shows a remarkable lowering in the flexural strength.

EXAMPLES 13 AND 14 AND COMPARATIVE EXAMPLE 11

Procedure was carried out in the same manner as in Examples 1 to 8, except that Ketjen Black ® EC600DJ having a DBP absorption of 480 ml/100 g (produced by Lion Akzo Co., Ltd.) was added as the electroconductive carbon black in an amount of 4 parts by weight per 100 parts by weight of the aromatic polysulfone resin powder. The results are shown in Table 3.

TABLE 2

| | Composition | | | | | |
|---|---|---|---|---|---|---|
| | Aromatic polysulfone (part by weight) | Glass fiber (part by weight) | Electroconductive carbon black Kind | Amount (part by weight) | Surface active agent Kind | Amount (part by weight) |
| Example 9 | 100 | 25 | Vulcan XC-72 | 14 | Flurad FC-95 | 0.7 |
| Example 10 | 100 | 25 | " | 14 | " | 1.4 |
| Example 11 | 100 | 25 | " | 14 | Ftergent 100 | 1.4 |
| Example 12 | 100 | 25 | " | 14 | " | 2.1 |
| Comparative | | | | | | |
| Example 8 | 100 | 25 | Vulcan XC-72 | 14 | — | — |
| Example 9 | 100 | 25 | " | 14 | Flurad FC-95 | 0.05 |
| Example 10 | 100 | 25 | " | 14 | Ftergent 100 | 3.0 |
| Example 9 | $10^{11}$ | 520 | 14 | 1220 | 212 | 5200 | 7100 |
| Example 10 | $10^{10}$ | 360 | 8 | 1190 | 212 | 5300 | 7400 |
| Example 11 | $10^{9}$ | 410 | 5 | 1160 | 212 | 5000 | 6700 |
| Example 12 | $10^{9}$ | 250 | 3 | 1120 | 212 | 5200 | 6800 |
| Comparative | | | | | | | |
| Example 8 | $10^{13}$ | 1120 | 30 | 1230 | 211 | 4700 | 7000 |
| Example 9 | $10^{13}$ | 1080 | 28 | 1230 | 212 | 4800 | 7000 |
| Example 10 | $10^{9}$ | 230 | 2 | 940 | 210 | 5600 | 7700 |

TABLE 3

| | Composition | | | | | |
|---|---|---|---|---|---|---|
| | Aromatic polysulfone (part by weight) | Glass fiber (part by weight) | Electroconductive carbon black Kind | Amount (part by weight) | Surface active agent Kind | Amount (part by weight) |
| Example 13 | 100 | 25 | Ketjen Black EC600DJ | 4 | Ftergent 100 | 0.7 |
| Example 14 | 100 | 25 | Ketjen Black | 4 | " | 1.4 |

TABLE 3-continued

| | | | EC600DJ | | | |
|---|---|---|---|---|---|---|
| Comparative Example 11 | 100 | 25 | Ketjen Black EC 600 DJ | 4 | — | — |
| Example 13 | $10^{11}$ | 500 | 9 | 1310 | 212 | 4600 | 5800 |
| Example 14 | $10^9$ | 130 | 4 | 1240 | 212 | 4900 | 6100 |
| Comparative Example 11 | $10^{13}$ | 1150 | 33 | 1350 | 211 | 4200 | 6300 |

The aromatic polysulfone resin compositions of the present invention containing the electroconductive carbon black and fluorocarbon-type surface active agent, as compared with the composition containing no fluorocarbon-type surface active agent (Comparative Example 11), show the same results as in Examples 1 to 8.

EXAMPLE 15 AND COMPARATIVE EXAMPLE 12

Procedure was carried out in the same manner as in Examples 13 and 14, except that a milled glass fiber (EFH 75-01; produced by Central Glass K. K.) was added as the glass fiber in an amount of 67 parts by weight per 100 parts by weight of the aromatic polysulfone resin powder. The results are shown in Table 4, and they are the same results as in Examples 13 and 14.

TABLE 4

| | Composition | | | | | |
|---|---|---|---|---|---|---|
| | Aromatic polysulfone (part by weight) | Glass fiber (part by weight) | Electroconductive carbon black | | Surface active agent | |
| | | | Kind | Amount (part by weight) | Kind | Amount (part by weight) |
| Example 15 | 100 | 67 | Ketjen Black EC600DJ | 4 | Ftergent 100 | 1.4 |
| Comparative Example 12 | 100 | 67 | Ketjen Black EC 600 DJ | 4 | — | — |
| Example 15 | $10^{10}$ | 320 | 8 | 1630 | 214 | 7000 | 8600 |
| Comparative Example 12 | $10^{13}$ | 1200 | 35 | 1750 | 214 | 6500 | 8800 |

EXAMPLES 16 AND 17 AND COMPARATIVE EXAMPLES 13 TO 15

Procedure was carried out in the same manner as in Example 15, except that there were used an aromatic polysulfone resin powder (VICTREX® PES 4100P; produced by ICI Co., Ltd.), Ketjen Black® EC or Vulcan® XC-72 as the electroconductive carbon black and Flurad® FC-95 as the fluorocarbon-type surface active agent. The results are shown in Table 5, and they show that the same results as in Examples 1 to 8 are also obtained with a system containing no glass fiber.

TABLE 5

| | Composition | | | | | |
|---|---|---|---|---|---|---|
| | Aromatic polysulfone (part by weight) | Glass fiber (part by weight) | Electroconductive carbon black | | Surface active agent | |
| | | | Kind | Amount (part by weight) | Kind | Amount (part by weight) |
| Example 16 | 100 | 0 | Ketjen Black EC | 7 | Flurad FC-95 | 0.7 |
| Example 17 | 100 | 0 | Vulcan XC-72 | 13 | " | 1.4 |
| Comparative Example 13 | 100 | 0 | — | | — | — |
| Example 14 | 100 | 0 | Ketjen Black | 7 | — | — |
| Example 15 | 100 | 0 | Vulcan XC-72 | 13 | — | — |
| Example 16 | $10^9$ | 150 | 5 | 1060 | 201 | 3500 | 4400 |
| Example 17 | $10^9$ | 300 | 7 | 1090 | 203 | 3800 | 5200 |
| Comparative Example 13 | $10^{16}$ | 2000 | >200 | 1300 | 208 | 1800 | 2200 |
| Example 14 | $10^{11}$ | 1100 | 30 | 1080 | 200 | 3300 | 4600 |
| Example 15 | $10^{12}$ | 1050 | 32 | 1120 | 204 | 3600 | 5100 |

The aromatic polysulfone resin composition of the present invention has such excellent antistatic properties that the initial charged voltage and half-life period are remarkably lowered as compared with a composition comprising only the aromatic polysulfone resin and electroconductive carbon black keeping the surface resistivity of $10^7$ to $10^{13}$ Ω, as well as a high thermal resistance and high dimensional accuracy. Therefore, this composition is very suitable for use as a material for electronic parts, office automation equipment parts and audiovisual equipment parts.

What is claimed is:

1. An aromatic polysulfone resin composition comprising 100 parts by weight of an aromatic polysulfone resin, 3 to 15 parts by weight per 100 parts of resin of an electroconductive carbon black having a dibutyl phthalate absorption of 150 ml/100 g or more and 0.1 to 2.5 parts by weight per 100 parts of resin of a fluorocarbon surface active agent wherein said agent shows a weight loss of less than or about 10% during processing of said resin.

2. An aromatic polysulfone resin composition according to claim 1, wherein the aromatic polysulfone resin comprises a repeating unit represented by the following formula;

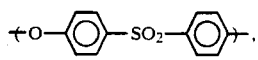 (1)

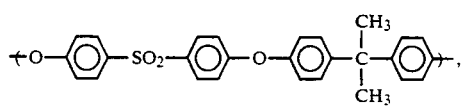 (2)

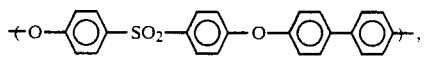 (3)

or

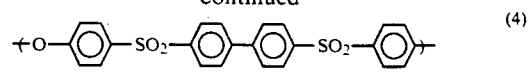 (4)

3. An aromatic polysulfone resin composition according to claim 2, wherein the aromatic polysulfone resin comprises a repeating unit represented by the formula (1).

4. An aromatic polysulfone resin composition according to claim 1, wherein the fluorocarbon surface active agent shows weight loss of 10 percent by weight or less measured at 350° C. by thermogravimetric analysis in which the agent is heated at a rate of increasing temperature of 10° C./min in a nitrogen gas atmosphere.

5. An aromatic polysulfone resin composition according to claim 1, wherein the fluorocarbon surface active agent is selected from the group consisting of a potassium salt of perfluoroalkylsulfonic acid, lithium salt of trifluoromethanesulfonic acid and sulfonic acid salt of a highly branched perfluorocarbon.

6. An aromatic polysulfone resin composition according to claim 1, which further contains fibrous reinforcing material in an amount of 120 parts by weight or less per 100 parts by weight of the aromatic polysulfone resin composition.

7. An aromatic polysulfone resin composition according to claim 6, wherein the fibrous reinforcing material is glass fiber.

* * * * *